United States Patent [19]

Ellis

[11] Patent Number: 5,653,293
[45] Date of Patent: Aug. 5, 1997

[54] PORTABLE WIRE PULLER

[76] Inventor: George E. Ellis, P.O. Box 1675, Denham Springs, La. 70727-1675

[21] Appl. No.: 550,395

[22] Filed: Oct. 30, 1995

[51] Int. Cl.⁶ .................................................. A01B 49/00
[52] U.S. Cl. .......................... 172/438; 37/403; 414/724; 242/598.2; 242/388.6; 242/403
[58] Field of Search .................... 172/438; 464/179; 403/305, 306, 307; 242/598.2, 599.1, 388.6, 403; 37/403, 468, 410; 414/694, 912, 722, 724; 254/134.3 FT

[56] References Cited

U.S. PATENT DOCUMENTS

| | | | |
|---|---|---|---|
| 188,187 | 3/1877 | Reno | 403/305 X |
| 540,834 | 6/1895 | Gumm | 403/305 X |
| 1,055,409 | 3/1913 | McMillin | 242/598.2 X |
| 1,407,335 | 2/1922 | Reynolds et al. | 403/305 X |
| 2,580,471 | 1/1952 | Smith | 414/694 |
| 3,028,697 | 4/1962 | Bator | 172/438 |
| 3,070,324 | 12/1962 | Bryman | 242/86.5 |
| 3,072,383 | 1/1963 | Vanderhagen | 254/134.3 |
| 3,117,686 | 1/1964 | Brown | 414/694 |
| 3,148,261 | 9/1964 | Schlenz | 242/388.6 X |
| 3,240,413 | 3/1966 | Young et al. | 226/172 |
| 3,329,367 | 7/1967 | Paradiso | 242/599.1 |
| 3,926,263 | 12/1975 | Frisbee et al. | 172/438 X |
| 3,964,425 | 6/1976 | Septor, Sr. | 242/403 X |
| 4,172,608 | 10/1979 | Brown, Jr. | 242/599.1 X |
| 4,260,064 | 4/1981 | Ekstam | 414/694 X |
| 4,270,734 | 6/1981 | Straight | 254/134.3 R |
| 4,353,515 | 10/1982 | Weaver et al. | 242/403 X |
| 4,413,808 | 11/1983 | Finkle | 254/134.3 FT |
| 4,447,013 | 5/1984 | Sandered et al. | 242/54 R |
| 4,497,470 | 2/1985 | Carter et al. | 254/134.3 FT |
| 4,643,397 | 2/1987 | Munns | 254/134.3 FT |
| 4,757,976 | 7/1988 | Langston | 254/134.3 FT |
| 4,871,127 | 10/1989 | Clark | 242/403 X |
| 4,917,362 | 4/1990 | Wilson | 254/134.3 FT |
| 5,131,204 | 7/1992 | Hiendl | 403/307 X |
| 5,236,051 | 8/1993 | Sawyer et al. | 172/438 |
| 5,238,225 | 8/1993 | Hunt | 254/134.3 FT |
| 5,356,209 | 10/1994 | Hill | 301/5.7 |
| 5,385,420 | 1/1995 | Newman, Sr. et al. | 403/306 X |
| 5,511,366 | 4/1996 | Roth | 56/8 |

Primary Examiner—Terry Lee Melius
Assistant Examiner—Victor Batson
Attorney, Agent, or Firm—Reginald F. Roberts, Jr.

[57] ABSTRACT

A portable wire puller designed to be operated from a motor vehicle having a hydraulic system. The wire puller utilizes a spool mounted on an axle which is made up of two rods which can be easily connected to and disconnected from one another, so that it is simple and easy to change spools quickly without dismantling the entire apparatus.

5 Claims, 7 Drawing Sheets

PORTABLE WIRE PULLER

BACKGROUND OF THE INVENTION

The present invention relates to electrical conduit. More particularly, the invention relates to pulling electrical wire or cable through underground electrical conduit.

This objective is usually accomplished by using a motor vehicle to pull in the wire or cable through the electrical conduit. It would, however, be clearly advantageous to have a wire puller that is portable, and which can be easily and quickly assembled and disassembled. The advantages of such a portable wire puller would include easy accessibility, and the capability of changing spools easily and quickly.

Both of these characteristics are highly advantageous in the field. Portability of the equipment makes for efficiency of time and effort. The need to change out spools arises very frequently, for many reasons, as is well known to those skilled in the art. A quicker and easier change-out increases efficiency and reduces down-time.

The present invention provides a wire puller that is portable, and that is easily and quickly assembled and disassembled.

SUMMARY OF THE INVENTION

In general, the present invention in one aspect provides an axle assembly for a portable wire puller. The assembly comprises (a) first and second bearings; (b) a first straight, rigid, elongated member having first and second ends; and (c) a second straight, rigid, elongated member having first and second ends. The first end of the first elongated member is disposed in the first bearing, and the second end of the first elongated member has an opening which includes a first set of threads. The first end of the second elongated member is constructed and arranged to fit into the opening in the second end of the first elongated member, and includes a second set of threads matching the first set of threads. The first end of the second elongated member can be connected to the second end of the first elongated member by inserting the first end of the second elongated member into the opening in the second end of the first elongated member and engaging the first and second sets of threads. The first end of the second elongated member can be disconnected from the second end of the first elongated member by disengaging the first and second sets of threads and withdrawing the first end of the second elongated member from the opening in the second end of the first elongated member. The second end of the second elongated member is disposed in the second bearing.

In a second aspect the invention provides a portable wire puller constructed and arranged to operate in combination with a motor vehicle having a hydraulic system. The wire puller comprises (a) first and second bearings; (b) a first straight, rigid, elongated member having first and second ends; (c) a second straight, rigid, elongated member having first and second ends; (d) a spool coaxially and rotatably mounted on the first elongated member, for reeling in the wire; (e) a motor for rotating the first and second elongated members; and (f) transmimssion means for coupling the motor with the first and second elongated members. The first end of the first elongated member is disposed in the first bearing, and the second end of the first elongated member has an opening which includes a first set of threads. The first end of the second elongated member is constructed and arranged to fit into the opening in the second end of the first elongated member and includes a second set of threads matching the first set of threads. The first end of the second elongated member can be connected to the second end of the first elongated member by inserting the first end of the second elongated member into the opening at the second end of the first elongated member and engaging the first and second sets of threads. The first end of the second elongated member can be disconnected from the second end of the first elongated member by disengaging the first and second sets of threads and withdrawing the first end of the second elongated member from the opening in the second end of the first elongated member. The second end of the second elongated member is disposed in the second bearing.

DETAILED DESCRIPTION OF THE INVENTION

Figure 1:
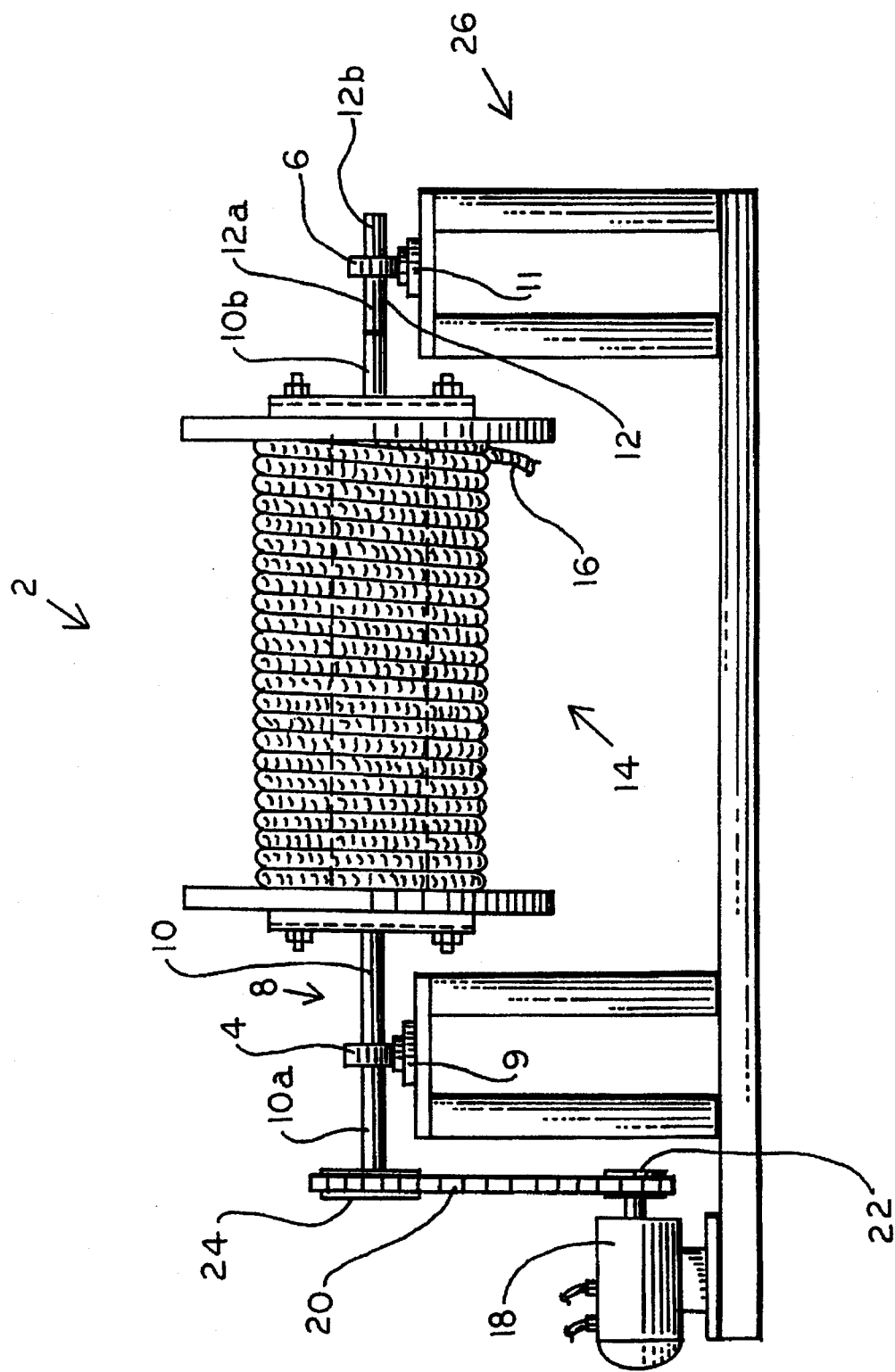
FIG. 1 is a front view of a first embodiment of a portable wire puller made in accordance with the principles of the present invention.
Figure 2:
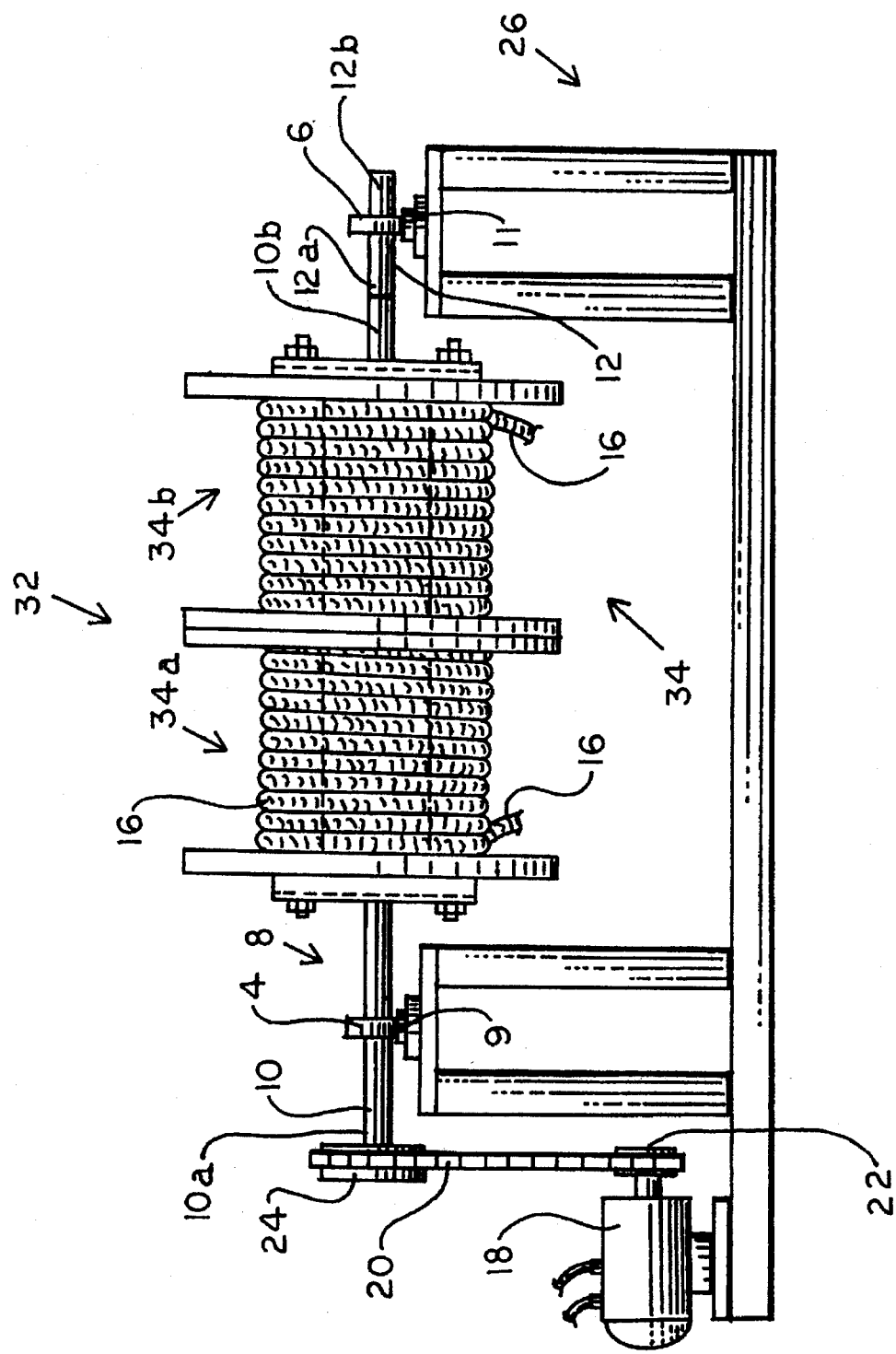
FIG. 2 is a front view of a second embodiment of a portable wire puller made in accordance with the principles of the present invention.
Figure 3:
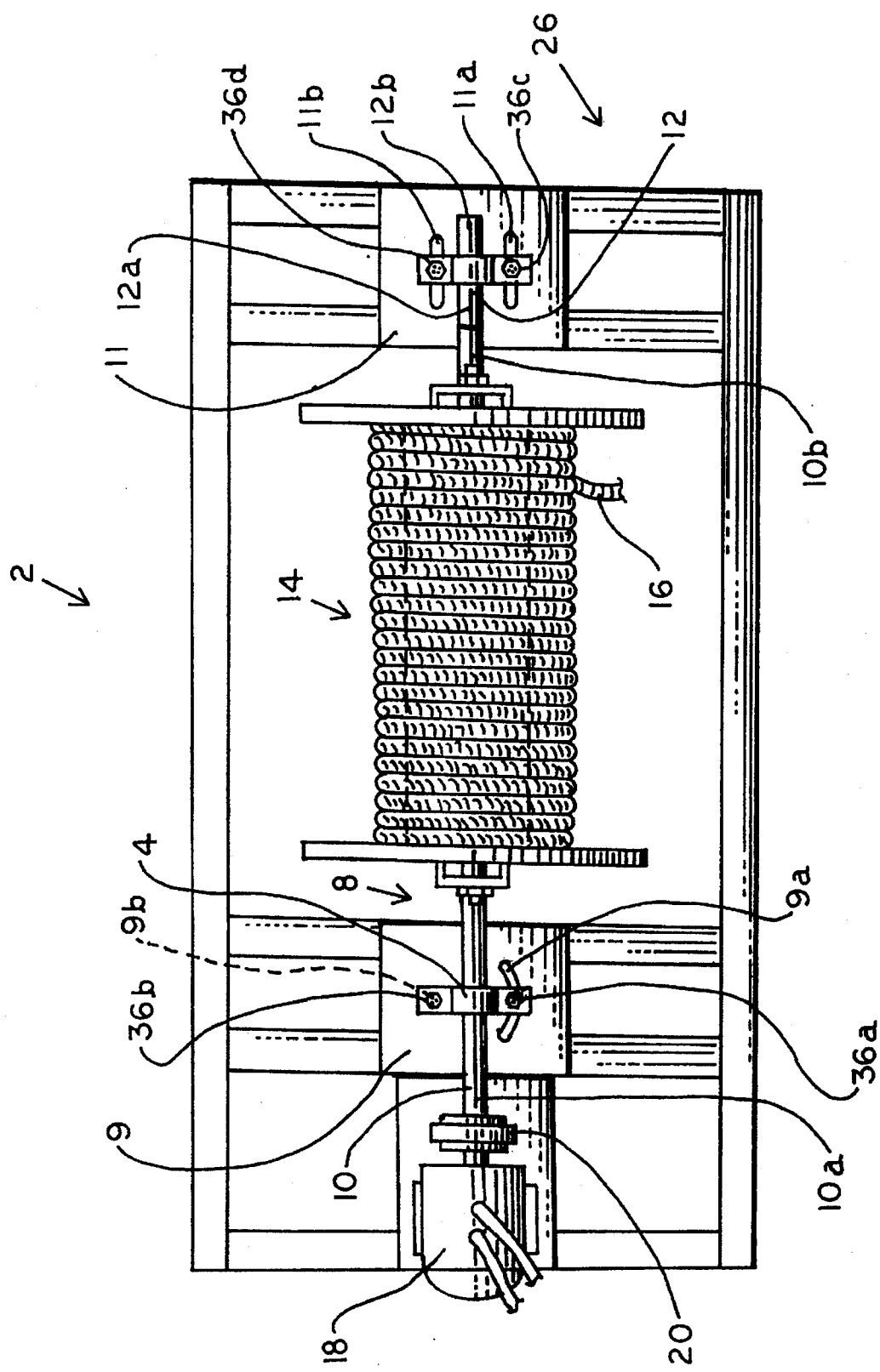
FIG. 3 is a top view of the wire puller shown in FIG. 1.

More specifically, reference is made to FIGS. 1 and 3, in which is shown a first embodiment of a portable wire puller made in accordance with the principles of the present invention, and generally designated by the numeral 2.

The wire puller 2 comprises first and second pillow-block bearings 4 and 6, respectively, in which an axle 8 is rotatably disposed. The first and second pillow-block bearings 4 and 6 are mounted on first and second plates 9 and 11, respectively.

The axle 8 includes a first rod 10 having first and second ends 10a and 10b, respectively, and a second rod 12 having first and second ends 12a and 12b, respectively.

A spool 14 is mounted on the axle 8, and is used to reel wire cable (not shown) attached to a rope 16. A motor 18 is coupled to the axle 8 through a chain 20 which engages first and second sprockets 22 and 24. The bearings 4 and 6, the plates 9 and 11, and the motor 18 are fastened and mounted to a frame 26.

Reference is now made to FIGS. 2, 4, 5, 6, and 7, in which is shown a second embodiment of a portable wire puller made in accordance with the principles of the present invention, and generally designated by the numeral 32. The second embodiment 32 differs from the first embodiment 2 by having a double spool 34 instead of a single spool 14, first and second portions of the spool 34 being designated 34a and 34b, respectively.

Figure 7:
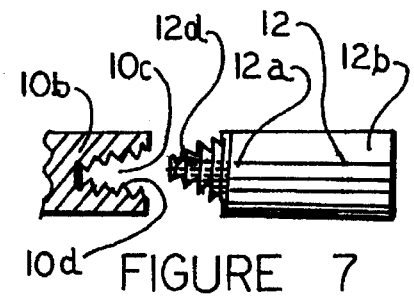
FIG. 7 is an enlarged view of one portion of FIG. 6.
Figure 6:
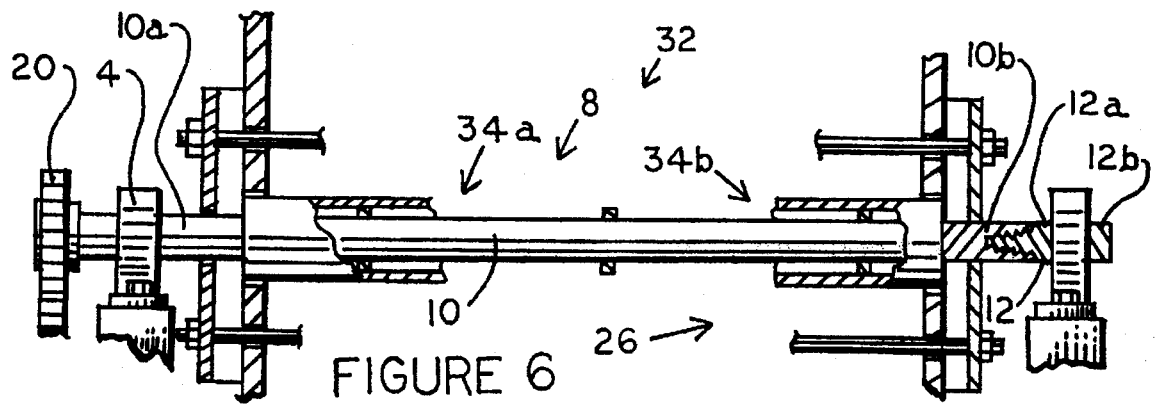
FIG. 6 is a fragmentary view of the wire puller shown in FIGS. 2 and 4, with certain parts removed.

The first end 10a of the first rod 10 is disposed in the first pillow-block bearing 4. As best seen in FIG. 7, the second end 10b of the first rod 10 has a conical, bevelled opening 10c which includes a first set of bevelled threads 10d. The first end 12a of the second rod 12 is conical and bevelled, and is constructed and arranged to fit into the bevelled opening 10c in the second end 10b of the first rod 10. The bevelled first end 12a of the second rod 12 includes a second set of bevelled threads 12d which match the first set of threads 10d. The first end 12a of the second rod 12 is connected to the second end 10b of the first rod 10 by inserting the first end 12a of the second rod 12 into the opening 10c in the second end 10b of the first rod 10 and engaging the first and second sets of threads 10d and 12d. The first end 12a of the second rod 12 is disconnected from the second end 10b of the first rod 10 by disengaging the first and second sets of threads 10d and 12d and withdrawing the first end 12a of the second rod 12 from the opening 10c in the second end 10b of the first rod 10. The second end 12b of the second rod 12 is disposed in the second bearing 6.

Figure 4:
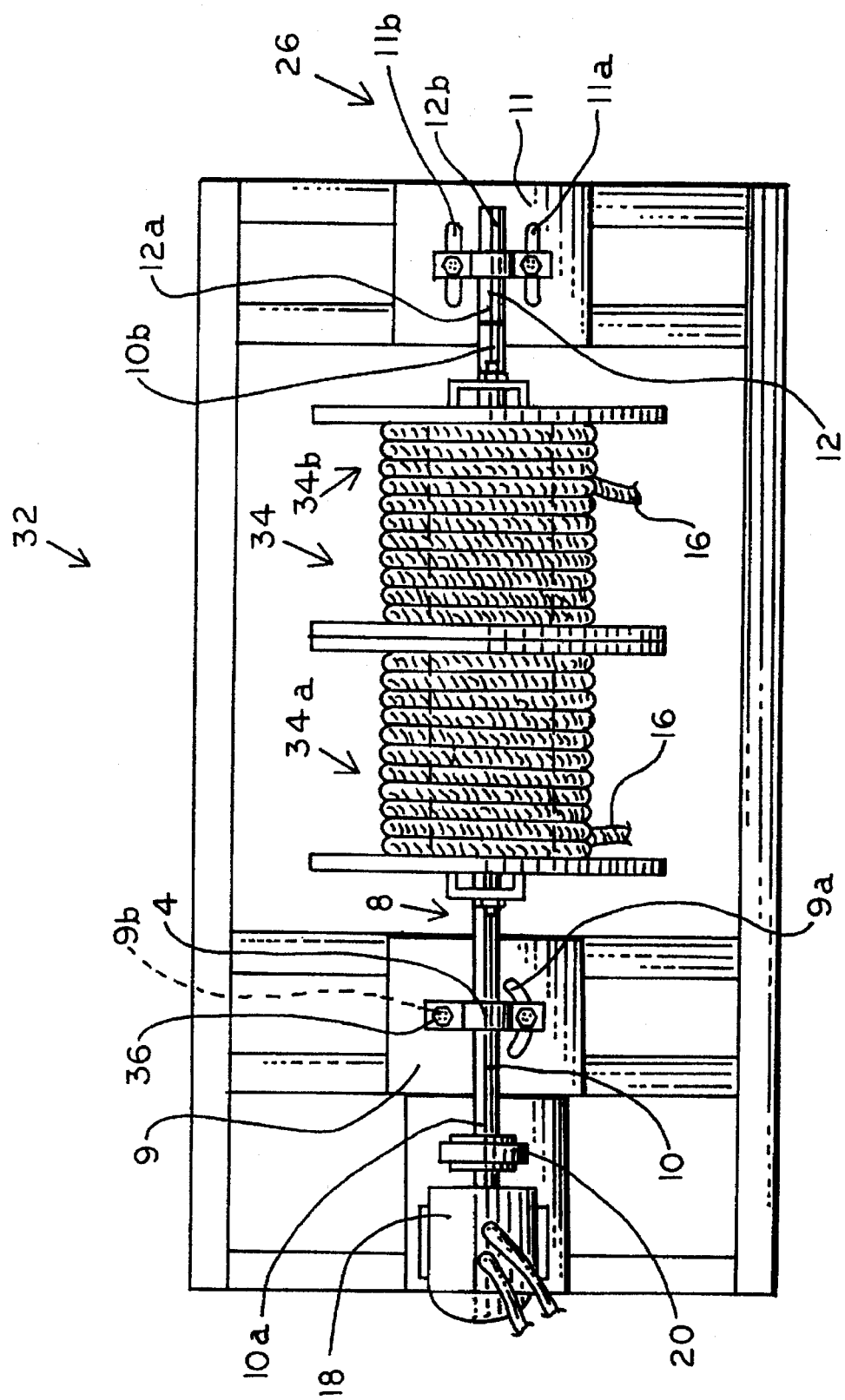
FIG. 4 is a top view of the wire puller shown in FIG. 2.
Figure 5:
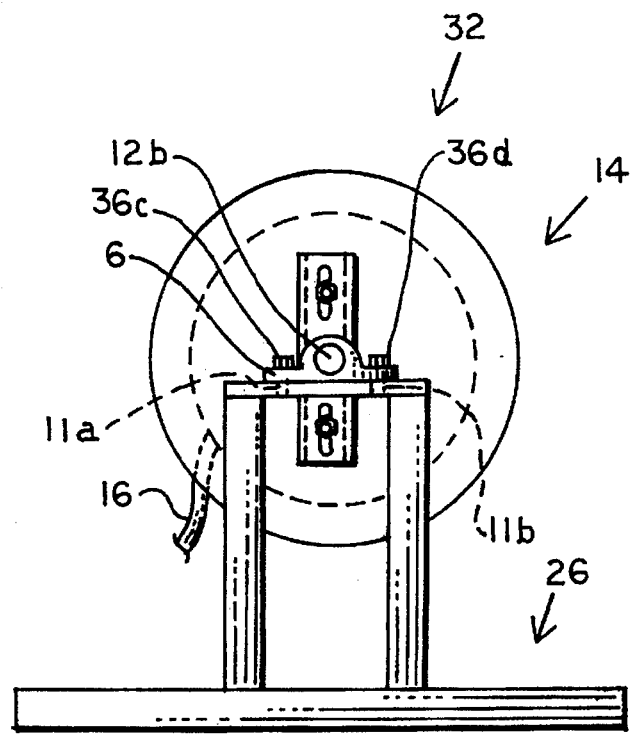
FIG. 5 is an end view of the wire puller shown in FIGS. 2 and 4.

As best seen in FIGS. 3 and 4, the first plate 9 includes a first opening 9a defining an arc, and a second opening 9b opposite the first opening 9a. The distance between the first and second openings 9a and 9b is equal to the radius of the arc defined by the first opening 9a.

The second plate 11 includes first and second parallel openings 11a and 11b, respectively, defining first and second parallel straight lines. A first bolt 36a is disposed in the first opening 9a in the first plate 9. A second bolt 36b is disposed in the second opening 9b. A third bolt 36c is disposed in the first opening 11a in the second plate 11, and a fourth bolt 36d in the second opening 11b.

It is frequently necessary to change spools in the field. Reasons for doing so include the age of the spool, the amount of rope on the spool, the age and condition of the rope, and the size and/or type of rope on the spool.

It will be apparent to those skilled in the art that the construction and arrangement of the portable wire pullers 2 and 32 confer a tremendous advantage with respect to connecting and disconnecting the spools 14 and 34 by connecting the second end 10b of the first rod 10 to the first end 12a of the second rod 12, and fastening the first, second, third, and fourth bolts 36a, 36b, 36c, 36d; and are quickly and easily disassembled by loosening the first, second, third, and fourth bolts 36a, 36b, 36c, 36d, disconnecting the first end 12a of the second rod 12 from the second end 10a of the first rod 10, and swinging the first rod 10 through an arc parallel to the arc defined by the first opening 9a in the first plate 9.

The portable wire pullers 2, 32 are beneficially operated from any motor vehicle having a hydraulic system. Preferably, the motor vehicle is a bulldozer, backhoe, trackhoe, bucket truck, digger truck, or crane truck. The hydraulic system may optionally and beneficially include a diverter.

Figure 8:
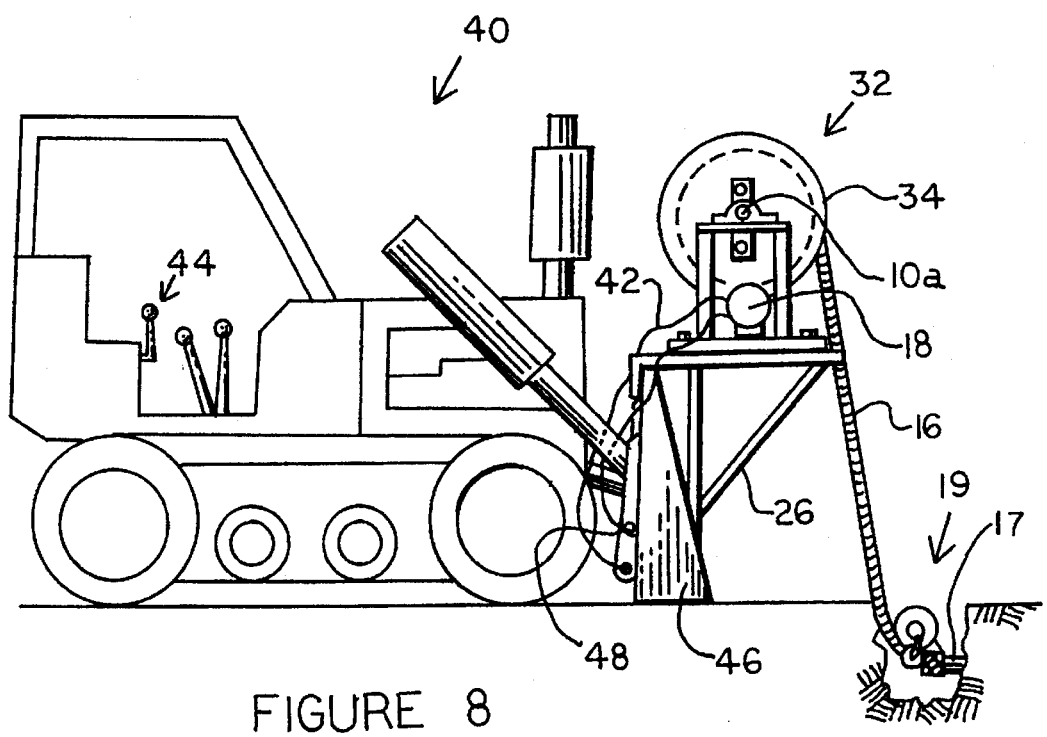
FIG. 8 is a side view of the wire puller shown in FIGS. 2 and 4, mounted on a bulldozer.

Reference is now made to FIG. 8, in which is shown the portable wire puller 32 mounted on the blade 46 of a bulldozer 40. The hydraulic motor 18 which powers the wire puller 32 is connected to the hydraulic tilt cylinder 48 of the bulldozer 40 by hydraulic hoses 42. The motor 18 is activated by the hydraulic tilt lever 44 which controls the tilt function of the hydraulic tilt cylinder 48.

Figure 9:
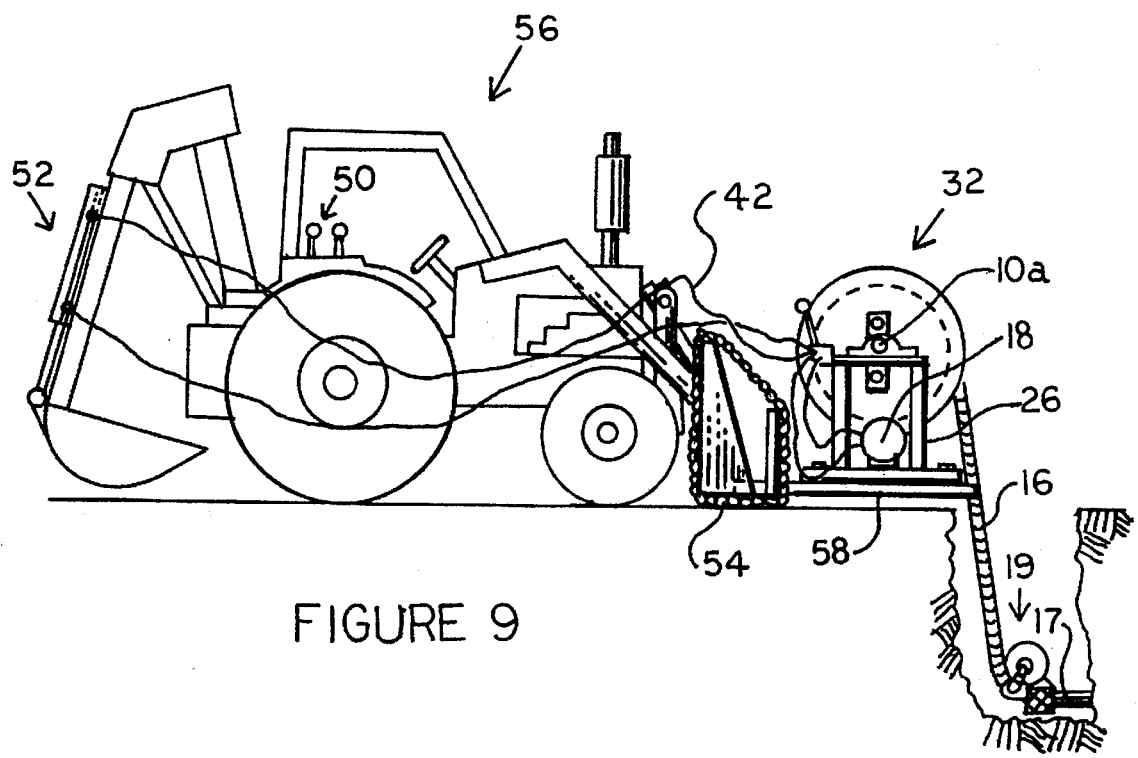
FIG. 9 is a side view of the wire puller shown in FIGS. 2 and 4, mounted on a backhoe.

As a second illustration, reference is made to FIG. 9, in which is shown the portable wire puller 32 mounted on the front bucket adapter 58 of a backhoe 56 having a hydraulic bucket cylinder 52 and a hydraulic bucket lever 50. The hydraulic motor 18 is connected by hydraulic hoses 42 to the bucket cylinder 52, and is activated by the bucket lever 50.

In operation, one end of the rope 16 is attached to the spool 14 or 34, and the other end of the rope 16 is attached by a connector 19 to one end of the cable or wire 17 to be pulled through a conduit (not shown). As the spool 14 or 34 is turned by the hydraulic motor 18, the wire or cable is pulled through the conduit. After this operation has been completed, the wire or cable is detached from the rope 16.

A second significant advantage of the construction and arrangement of the portable wire pullers 2 and 32 will now be apparent to those skilled in the art. Wire pullers such as 2 and 32 are too heavy to be lifted by a single individual for mounting or installation on a motor vehicle. This task is beneficially accomplished by disassembling the axle 8 and wire puller 2 or 32 as previously described, removing the spool 14 or 34, loading the spool 14, 34 and the remainder of the wire puller 2, 32 onto the motor vehicle, and then reassembling the wire puller 2, 32 as previously described.

Once the wire puller 2 or 32 has been mounted on the motor vehicle, the rope 16 is blown through the conduit using compressed air, and attached to an end of the wire or cable. The rope 16 and the attached wire or cable are then reeled in through the conduit, using the spool 14 or 34. The wire or cable is then detached from the rope 16.

Figure 10:
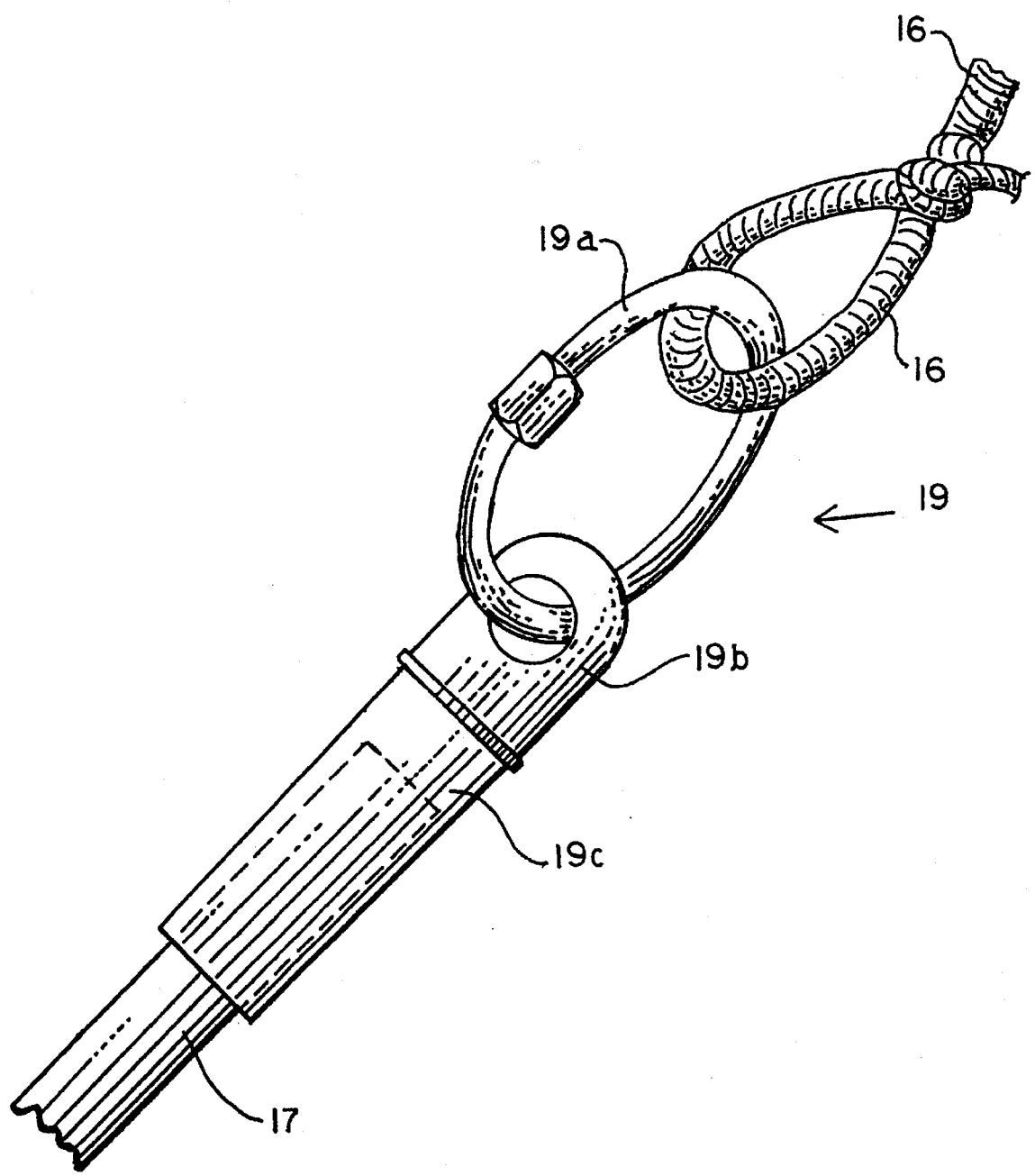
FIG. 10 is an enlarged view of one portion of FIG. 8 and of FIG. 9.

Reference is now made to FIG. 10, in which is shown the detailed construction of the connector 19 and the way in which the connector 19 connects the rope 16 to the cable 17.

The connector 19 includes a metal-chain connector 19a forming a loop when connected as shown. One end of the rope 16 is looped around one end of the metal-chain connector 19. The other end of the metal-chain connector 19a engages a metal eye 19b, to which is attached a braided connector 19c. One end of the cable 17 is disposed in the braided connector 19c. As tension is placed on the rope 16, connector 19, and cable 17, the braided connector 19c tightens around the end of the cable 17 disposed therein.

While certain specific embodiments and details have been described to illustrate the present invention, it will be apparent to those skilled in the art that many modifications of the invention may and can be made without departing from the spirit and scope of the invention.

I claim:

1. An axle assembly for a portable wire puller, the assembly comprising:
   (a) first and second bearings;
   (b) a first straight, rigid, elongated member having first and second ends, the first end of the first elongated member being constructed and arranged to be disposed in the first bearing, the second end of first elongated member having an opening which includes a first set of threads; and
   (c) a second straight, rigid, elongated member having first and second ends, the first end of the second elongated member being constructed and arranged to fit into the opening in the second end of the first elongated member and including a second set of threads matching the first set of threads, whereby the first end of the second elongated member can be connected to the second end of the first elongated member by inserting the first end of the second elongated member into the opening in the second end of the first elongated member and engaging the first and second sets of threads, and the first end of the second elongated member can be disconnected from the second end of the first elongated by disengaging the first and second sets of threads and withdrawing the first end of the second elongated member from the opening in the second end of the first elongated member, the second end of the second elongated member being constructed and arranged to be disposed in the second bearing;

(d) a first plate for mounting the first bearing thereon, the first plate including a first opening defining a circular arc, and a second opening opposite the first opening, the distance between the first and second openings being equal to the radius of the arc defined by the first opening;

(e) a second plate for mounting the second bearing thereon, the second plate including first and second parallel openings defining first and second parallel straight lines;

(f) a first bolt for disposal in the first opening in the first plate;

(g) a second bolt for disposal in the second opening in the first plate;

(h) a third bolt for disposal in the first opening in the second plate; and (i) a fourth bolt for disposal in the second opening in the second plate;

whereby the axle assembly can be assembled by connecting the second end of the first elongated member to the first end of the second elongated member, and fastening the first, second, third, and fourth bolts; and the axle assembly can be disassembled by loosening the first, second, third, and fourth bolts, disconnecting the first end of the second elongated member from the second end of the first elongated member, and swinging the first elongated member through an arc parallel to the arc defined by the first opening in the first plate.

2. An axle assembly for a portable wire puller, the assembly comprising:

(a) first and second bearings;

(b) a first straight, rigid, elongated member having first and second ends, the first end of the first elongated member being disposed in the first bearing, the second end of the first elongated member having an opening which includes a first set of threads;

(c) a second straight, rigid, elongated member having first and second ends, the first end of the second elongated member being constructed and arranged to fit into the opening in the second end of the first elongated member and including a second set of threads matching the first set of threads, whereby the first end of the second elongated member can be connected to the second end of the first elongated member by inserting the first end of the second elongated member into the opening in the second end of the first elongated member and engaging the first and second sets of threads, and the first end of the second elongated member can be disconnected from the second end of the first elongated member by disengaging the first and second sets of threads and withdrawing the first end of the second elongated member from the opening in the second end of the first elongated member, the second end of the second elongated member being disposed in the second bearing;

(d) a first plate on which the first bearing is mounted, the first plate including a first opening defining a circular arc, and a second opening opposite the first opening, the distance between the first and second openings being equal to the radius of the arc defined by the first opening;

(e) a second plate on which the second bearing is mounted, the second plate including first and second parallel openings defining first and second parallel straight lines;

(f) a first bolt disposed in the first opening in the first plate;

(g) a second bolt disposed in the second opening in the first plate;

(h) a third bolt disposed in the first opening in the second plate; and (i) a fourth bolt disposed in the second opening in the second plate;

whereby the axle assembly can be assembled by connecting the second end of the first elongated member to the first end of the second elongated member, and fastening the first, second, third, and fourth bolts; and the axle assembly can be disassembled by loosening the first, second, third, and fourth bolts, disconnecting the first end of the second elongated member from the second end of the first elongated member, and swinging the first elongated member through an arc parallel to the arc defined by the first opening in the first plate.

3. A portable wire puller constructed and arranged to operate in combination with a motor vehicle having a hydraulic system, the wire puller comprising:

(a) first and second bearings;

(b) a first straight, rigid, elongated member having first and second ends, the first end of the first elongated member being disposed in the first bearing, the second end of the first elongated member having an opening which includes a first set of threads;

(c) a second straight, rigid, elongated member having first and second ends, the first end of the second elongated member being constructed and arranged to fit into the opening in the second end of the first elongated member and including a second set of threads matching the first set of threads, whereby the first end of the second elongated member can be connected to the second end of the first elongated member by inserting the first end of the second elongated member into the opening in the second end of the first elongated member and engaging the first and second sets of threads, and the first end of the second elongated member can be disconnected from the second end of the first elongated member by disengaging the first and second sets of threads and withdrawing the first end of the second elongated member from the opening in the second end of the first elongated member, the second end of the second elongated member being disposed in the second bearing;

(d) a spool coaxially and rotatably mounted on the first elongated member, for reeling in the wire;

(e) a motor for rotating the first and second elongated members;

(f) transmission means for coupling the motor with the first and second elongated members;

(g) a first plate on which the first bearing is mounted, the first plate including a first opening defining a circular arc, and further including a second opening opposite the first opening, the distance between the first and second openings being equal to the radius of the arc defined by the first opening;

(h) a second plate on which the second bearing is mounted, the second plate including first and second parallel grooves defining first and second parallel straight lines;

(i) a first bolt disposed in the first opening in the first plate;

(j) a second bolt disposed in the second opening in the first plate;

(k) a third bolt disposed in the first opening in the second plate; and (l) a fourth bolt disposed in the second opening in the second plate;

whereby the wire puller can be assembled by connecting the second end of the first elongated member to the first end of the second elongated member, and fastening the first, second, third, and fourth bolts; and the wire puller can be disassembled by loosening the first, second, third, and fourth bolts, disconnecting the first end of the second elongated member from the second end of the first elongated member, and swinging the first elongated member through an arc parallel to the arc defined by the first opening in the first plate.

4. An axle assembly for a portable wire puller, the assembly comprising:

(a) first and second bearings;

(b) a first straight, rigid, elongated member having first and second ends, the first end of the first elongated member being disposed in the first bearing, the second end of the first elongated member having an opening which includes a first set of threads; and (c) a second straight, rigid, elongated member having first and second ends, the first end of the second elongated member being constructed and arranged to fit into the opening in the second end of the first elongated member and including a second set of threads matching the first set of threads, whereby the first end of the second elongated member can be connected to the second end of the first elongated member by inserting the first end of the second elongated member into the opening in the second end of the first elongated member and engaging the first and second sets of threads, and the first end of the second elongated member can be disconnected from the second end of the first elongated member by disengaging the first and second sets of threads and withdrawing the first end of the second elongated member from the opening in the second end of the first elongated member, the second end of the second elongated member being disposed in the second bearing;

wherein the first and second bearings are pillow-block bearings, and wherein the axle assembly further comprises:

(d) a first plate on which the first pillow-block bearing is mounted, the first plate including a first opening defining a circular arc, and a second opening opposite the first opening, the distance between the first and second openings being equal to the radius of the arc defined by the first opening;

(e) a second plate on which the second pillow-block bearing is mounted, the second plate including first and second parallel openings defining first and second parallel straight lines;

(f) a first bolt disposed in the first opening in the first plate;

(g) a second bolt disposed in the second opening in the first plate;

(h) a third bolt disposed in the first opening in the second plate; and (i) a fourth bolt disposed in the second opening in the second plate;

whereby the axle assembly can be assembled by connecting the second end of the first elongated member to the first end of the second elongated member, and fastening the first, second, third, and fourth bolts; and the axle assembly can be disassembled by loosening the first, second, third, and fourth bolts, disconnecting the first end of the second elongated member from the second end of the first elongated member, and swinging the first elongated member through an arc parallel to the arc defined by the first opening in the first plate.

5. A portable wire puller constructed and arranged to operate in combination with a motor vehicle having a hydraulic system, the wire puller comprising:

(a) first and second bearings;

(b) a first straight, rigid, elongated member having first and second ends, the first end of the first elongated member being disposed in the first bearing, the second end of the first elongated member having an opening which includes a first set of threads;

(c) a second straight, rigid, elongated member having first and second ends, the first end of the second elongated member being constructed and arranged to fit into the opening in the second end of the first elongated member and including a second set of threads matching the first set of threads, whereby the first end of the second elongated member can be connected to the second end of the first elongated member by inserting the first end of the second elongated member into the opening in the second end of the first elongated member and engaging the first and second sets of threads, and the first end of the second elongated member can be disconnected from the second end of the first elongated member by disengaging the first and second sets of threads and withdrawing the first end of the second elongated member from the opening in the second end of the first elongated member, the second end of the second elongated member being disposed in the second bearing;

(d) a spool coaxially and rotatably mounted on the first elongated member, for reeling in the wire;

(e) a motor for rotating the first and second elongated members; and (f) transmission means for coupling the motor with the first and second elongated members;

wherein the first and second bearings are pillow-block bearings, and wherein the wire puller further comprises:

(g) a first plate on which the first pillow-block bearing is mounted, the first plate including a first opening defining a circular arc, and further including a second opening opposite the first opening, the distance between the first and second openings being equal to the radius of the arc defined by the first opening;

(h) a second plate on which the second pillow-block bearing is mounted, the second plate including first and second parallel grooves defining first and second parallel straight lines;

(i) a first bolt disposed in the first opening in the first plate;

(j) a second bolt disposed in the second opening in the first plate;

(k) a third bolt disposed in the first opening in the second plate; and (l) a fourth bolt disposed in the second opening in the second plate;

whereby the wire puller can be assembled by connecting the second end of the first elongated member to the first end of the second elongated member, and fastening the first, second, third, and fourth bolts; and the wire puller can be disassembled by loosening the first, second, third, and fourth bolts, disconnecting the first end of the second elongated member from the second end of the first elongated member, and swinging the first elongated member through an arc parallel to the arc defined by the first opening in the first plate.

* * * * *